Dec. 21, 1954  G. W. GROSCH  2,697,582

ADJUSTABLE OUTLET GATE FOR IRRIGATION PIPES

Filed Jan. 6, 1950

INVENTOR.
Gottlieb W. Grosch
BY

United States Patent Office 2,697,582
Patented Dec. 21, 1954

2,697,582

ADJUSTABLE OUTLET GATE FOR IRRIGATION PIPE

Gottlieb W. Grosch, Silver Creek, Nebr.

Application January 6, 1950, Serial No. 137,078

2 Claims. (Cl. 251—145)

This invention relates to outlet gates for irrigation pipes and more particularly it is an object of this invention to provide an outlet gate which is adapted for the even flowing of water.

Heretofore gates have been constructed in many forms, many of which cause the water to spurt out in irregular fashion with a lesser quantity of flow per minute than is possible with the gate valve of my invention.

A further object of the invention is to provide a valve which can be easily made and economically attached to a hole in an irrigation pipe.

Yet a further object is to provide a valve constructed so that when the core and bushing are removed a water hose or spray connection can be substituted for these members.

Yet another object is to provide a valve which can be adjusted, removed or replaced while water is running in an irrigation pipe.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 3:
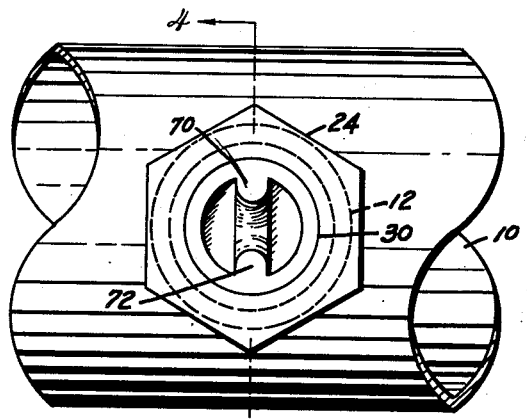
Figure 3 is a frontal elevation of the pipe shown with one of the valves of this invention installed thereon.

The outlet valve of this invention is for an irrigation pipe generally shown at 10 in Figure 3. The pipe 10 is provided with a circular opening generally indicated in dotted lines at 12 in a side thereof.

Figure 1:
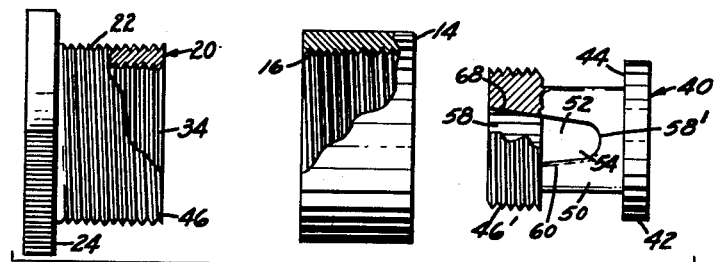
Figure 1 is an exploded view showing the several parts of the valve spaced apart, and with sections of each part removed to indicate the interior construction.

In accordance with this invention an internally threaded collar 14 is provided as best seen in Figure 1, having internal threads 16. The collar 14 is of cylindrical shape in exterior or otherwise of an exterior for fitting a differently shaped opening 12.

The collar 14 is set or fabricated into the pipe in a fashion so that it is suitably secured to the pipe and so that no leakage can occur between the edge of the opening 12 and the collar 14.

A bushing 20 is provided having a cylindrical innermost portion indicated at 22. The portion 22 having a threaded exterior and a threaded interior.

The bushing 20 also has a head portion 24 attached to the outer end thereof, the head portion 24 having an exterior of a shape adapted to receive a wrench, being preferably of a hexagonal shape as best seen in Figure 3.

The head end 24 of the bushing 20 is provided with an opening therethrough indicated in Figure 3 at 30, the opening being threaded similarly to the threads 34 on the interior of the innermost portion 22 of the bushing 20.

A valve core generally indicated at 40 is provided having an innermost end which is cylindrically shaped in exterior as seen at 42. The innermost end 42 serves as a valve head and is in the nature of a circular plate which has an outermost flat surface 44 which is adapted to engage the inner end 46 of the bushing 20 for closing the opening in the bushing 20 and to close the valve at desired times.

The valve core member 40 further includes on its outer end an externally threaded sleeve portion 46' which is complemental to and engaged on the inner threads of the bushing 20.

The valve core 40 further has a connecting portion or web portion 50 which connects the sleeve portion 46' to the head portion 42. The web portion 50 is of lesser diameter than the exterior of the portion 46' and the diameter of the valve head portion 42 is of a greater diameter than the portion 46' and is substantially the same diameter as the exterior of the innermost portion 22 of the bushing 20.

The web 50 is hollow, particularly at its outer end, such hollow interior being indicated at 52 and the web portion 50 has an opening in the exterior thereof shown at 54 and disposed between the portion 46' and the portion 42 of the core member 40, the opening 54 entering into the hollow interior 52 which latter is itself in direct communication with a hollow interior wall 58 of the threaded outer end portion 46' of the valve core member 40.

Figure 2:
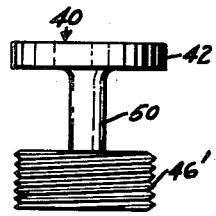
Figure 2 is a valve core of Figure 1 shown resting on its inner end and appearing substantially as it would be seen from the bottom side in Figure 1.

The web portion 50 is further provided with another opening on the opposite side thereof which latter is also seen at 54 in Figure 1, the two openings being directly opposite one another and being of the same shape, the innermost end of each opening 54 being arcuately curved as seen at 58 so as to be concave on the outer side as at 58 for the even flow of water. The opening 54 is preferably of a larger size on its outermost end as seen at 60, the side walls tapering gradually from the inner end 58 outwardly and being continuous with walls 68 on the interior of the outer end 46' portion. In this way the water can flow evenly therethrough with the least resistance; as best seen in Figure 2 the web portion 50 is relatively thin as seen when rotated through ninety degrees from the position shown in Figure 1. Consequently, the web 50 appears to consist when viewed from the outer side in Figure 3 of two inwardly extending portions 70 and 72 which connect the portion 46' to the head portion 42 of the valve core.

Figure 4:
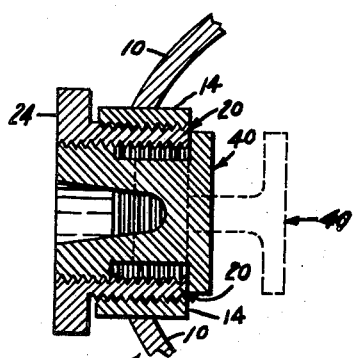
Figure 4 is a view-in-section taken along the line 4—4 of Figure 3 and with an innermost position of the valve core shown in dotted lines.

As best seen in Figure 4, the valve core can be rotated by placing a suitable tool in the opening 58 of the valve core, and when the valve core is turned inwardly sufficiently it will take up the dotted line position shown at 40 in Figure 4 in which water can flow evenly in the openings 54 to the hollow interior of the web 50 and through the opening 58.

When the valve core is rotated in another direction it will eventually seat itself against the inner end 46 of the bushing 20, the inner end 46 being normally in a vertical plane and parallel to the flat surface 44 of the valve head portion 42.

As thus described this invention has provided a valve particularly adapted for even flow of liquid and which is easily installed, removed and adjusted.

I claim:

1. An outlet gate for an irrigation pipe comprising an internally threaded collar adapted to be secured in an opening in a pipe, a bushing threaded internally and externally and positioned in the collar, and a valve core including an externally threaded sleeve with a transversely disposed web providing a valve stem extended across the interior of the sleeve and also extended from one end of the sleeve, and said web having a circular plate providing a valve head on the extended end thereof.

2. In an outlet valve fitting for an irrigation pipe, the combination which comprises an internally threaded collar, a pipe having an opening therein in which the said collar is welded, a bushing threaded internally and externally and having an annular flange with wrench gripping surfaces thereon on the outer surface of one end, and a valve core including an externally threaded sleeve with a transversely disposed web extended across the interior and also extended from one end thereof and having a circular plate providing a valve head carried on the extended end of the web whereby with the bushing threaded in the collar and the core threaded in the bushing the valve head seats against the end of the bushing, the head passing into the said collar.

References Cited in the file of this patent

UNITED STATES PATENTS

| Number | Name | Date |
|---|---|---|
| 638,321 | Clark | Dec. 5, 1899 |
| 1,565,913 | Rosker | Dec. 15, 1925 |
| 1,848,700 | Derster | Mar. 8, 1932 |
| 1,941,482 | Mollberg | Jan. 2, 1934 |
| 2,001,610 | Hildenbrand | May 14, 1935 |
| 2,374,690 | Laue | May 1, 1945 |

FOREIGN PATENTS

| Number | Country | Date |
|---|---|---|
| 45,496 | Norway | Aug. 20, 1928 |
| 111,285 | Germany | June 25, 1900 |
| 451,919 | France | 1913 |